United States Patent [19]

Brandkvist

[11] Patent Number: 5,047,151
[45] Date of Patent: Sep. 10, 1991

[54] SCUM SKIMMING SYSTEM FOR CIRCULAR SEDIMENTATION AND THICKENING TANKS

[76] Inventor: Jan O. Brandkvist, 176 Sherwood Ave., Toronto, Ontario, Canada, M4P 2A8

[21] Appl. No.: 538,059

[22] Filed: Jun. 13, 1990

[51] Int. Cl.⁵ ............................................. B01D 21/06
[52] U.S. Cl. .................................... 210/525; 210/541; 210/542
[58] Field of Search ................ 210/525, 523, 541, 542

[56] References Cited

U.S. PATENT DOCUMENTS 3,919,090 11/1975 Shaffer ................................ 210/525
4,005,019 1/1977 Parlette .............................. 210/525

OTHER PUBLICATIONS

Drawing No. A1 051 M 010 sheet M10 of M14 dated Jun. 1988.
Drawing No. A1 051 M001 sheet M1 of M 15 dated Jun. 1988.
Drawing No. A1 051 P001 sheet P1 of P9 dated Jun. 1988.
Drawing No. A1 051 P007 sheet P7 of P9 dated Jun. 1988.
Contract No. GC-204 Tender Document, Sep. 1988.

Primary Examiner—Frank Sever
Attorney, Agent, or Firm—Rogers, Bereskin & Parr

[57] ABSTRACT

A scum skimming device is disclosed for use in a waste treatment system having a circular sedimentation tank. Such tanks typically have a central waste liquid inlet pipe having inlet ports and an outlet weir around the periphery to maintain the waste liquid level in the tank at a predetermined desired level. The scum skimming device consists of at least one scum skimming blade which is biased into a position partly above and partly below the liquid surface and which sweeps the surface of the tank, the blade being supported from a bottom sludge rake by articulated support posts. The device also consists of a generally helical blade extending to the tank periphery and being positioned with a portion of the helical blade below the waste liquid level when the tank is in use, and a drive means for rotating the generally helical blade. A trough is provided partially enclosing the helical blade, the trough having an open side at about the liquid level to allow floating scum to enter the trough and encounter the helical blade. In use, the scum skimming blade directs the scum through the trough opening and into contact with the helical blade, and the helical blade is rotated by the drive unit in a manner tending to keep the scum in the trough while moving the scum lengthwise along the trough to a discharge point outside the tank. In a further embodiment, the trough contains a sloped portion rising above the liquid level to allow the liquids to drain from the scum being transported.

21 Claims, 10 Drawing Sheets

SCUM SKIMMING SYSTEM FOR CIRCULAR SEDIMENTATION AND THICKENING TANKS

FIELD OF THE INVENTION

This invention relates generally to waste water treatment plants which utilize sedimentation tanks or thickening tanks to separate solids from liquid at various stages of the process. In particular, the invention relates to the removal of scum, grease, oil or other floating solids from the surface of such tanks. The invention has application where floatable materials are separated from liquids, such as in the sewage treatment, pulp and paper production and mineral processing fields.

BACKGROUND TO THE INVENTION

In circular sedimentation tanks or sludge thickeners the sludge solids, which settle to the bottom of the tank are normally moved from the periphery along the tank bottom to a sludge hopper at the centre of the tank by a rotating sludge collecting device which rotates around the centre of the tank. Collection of sludge is usually facilitated by inwardly sloped or conical bottom surfaces in such tanks.

The sludge collecting device generally consists of a large diameter central support tube which supports a gear drive unit and a centre bearing from which is suspended a drive cage structure extending down to just above the tank floor. Mounted on the drive cage are two opposed sludge collecting rake arms which extend outwardly to opposite walls of the circular tank. At the bottom of the rake arms are mounted a row of rakes or plow blades. These rakes or blades are usually mounted at 45 degrees to the direction of travel of the arms. When the device is rotating the plow blades will gradually rake the bottom sludge towards a centre hopper. The sludge is then removed by pumping for further treatment. The central drive support tube typically also serves as an inlet tube for fluid flow into the tank and is provided with inlet ports into the tank at or near the designed operating liquid level. Clarified liquid exits the tank over an effluent weir running continuously along the outer periphery of the tank. The flow that spills over the weir is collected in an effluent trough which runs all along the outside of the tank.

A significant portion of the solids entering the tank float and tend to collect at the liquid surface together with other liquid floating matter such as grease and oil. This layer which is a mixture of solids, oils and greases in varying proportions is generally known as scum.

In sludge thickening tanks using a dissolved air floatation method the surface layer is mainly sludge made buoyant by a large number of tiny air bubbles attached to the sludge particles. The air bubbles are produced by releasing high pressure air into the tank inlet pipe.

To improve the flow pattern inside the sedimentation tank and to prevent short circuiting along the tank surface from the inlet ports to the outlet weir, a cylindrical inlet baffle is suspended around the centre inlet area, extending about half way down from the liquid surface.

In circular sedimentation tanks the scum and floatables are expected to float outwardly towards the tank periphery. To prevent the scum from escaping over the outlet weir a continuous, shallow baffle plate is placed just inside the weir at the liquid level.

Typical scum collecting equipment consists of a travelling scum skimming blade and a scum weir and hopper located near the periphery of the tank. The scum skimming blade is supported from one of the sludge rake arms. As the mechanism rotates the surface skimming blade sweeps along a narrow band around the inner edge of the scum weir and pushes the scum into a scum hopper. The collected scum is then pumped away.

In many cases such conventional scum removal equipment works less than satisfactorily. This is particularly the case when the sewage is mixed with industrial wastes and greases that do not flow easily. Scum that remains on the surface for a long period will become odorous and result in odor complaints. Also the scum often gets trapped inside the cylindrical inlet baffle, where it can remain in a thick layer and again cause odors. Some prior designs have provided small scum ports in the inlet baffle at the liquid surface, but this is not always effective, as there is no positive action which drives the scum layer out of the baffle area. This is especially true for thick and cohesive scum, which may not be able to easily pass through a small port.

In cold climates there is an additional problem if scum is not removed regularly. Floating scum on the liquid surface may cool down and freeze solid. Such frozen material will further inhibit the removal and may also cause damage to the skimming mechanism or overloading of the gear drive.

What is desired is a scum skimming system that continuously cleans the entire circular tank surface and which prevents scum from building up and creating odor and icing problems. What is also desired is a scum removal system that prevents any unwanted loss of liquid from the tank by effectively separating all manner of scum from the clarified liquid. It is also desired to provide an improved scum skimming system which is completely compatible with commonly used sludge removal methods and which adapts easily to circular sedimentation tanks.

Further it is desired to provide a scum skimming system that is simple and economical, that can handle varying conditions and can be easily adjusted to give desired scum consistency for mixing and pumping without excess water. As such, it is preferable to have a system that uses readily available hardware, has few moving parts and that adapts t existing sludge collecting equipment.

BRIEF SUMMARY OF THE INVENTION

A scum skimming device for use in a waste treatment system having a sedimentation tank, said tank being an enclosure defined by a bottom and a surrounding cylindrical wall, said tank having a central waste liquid inlet pipe having inlet ports, and having an outer outlet weir to maintain the waste liquid level in said tank substantially constant, the scum skimming device comprising:

a scum skimming blade which is biased into a position partly above and partly below the liquid surface and which sweeps the surface of the tank, said blade being supported from the bottom sludge rake by articulated support posts;

a generally helical blade extending to the tank periphery, and being positioned with a portion of the helical blade below the waste liquid level when the tank is in use;

and a trough partially enclosing said helical blade, said trough being open along one side at about the liquid level to allow floating scum to enter the trough and encounter the helical blade said scum skimming blade forcing said scum into contact with said helical blade and said helical blade being rotated by a drive unit, said rotation tending to keep said scum in said trough while moving said scum lengthwise along said trough to a discharge point outside said tank.

BRIEF DESCRIPTION OF THE DRAWINGS

For a better understanding of the present invention, and to show more clearly how to put it into effect, reference will now be made, by way of example only, to the following drawings, in which.

DETAILED DESCRIPTION OF THE INVENTION

Figure 1:
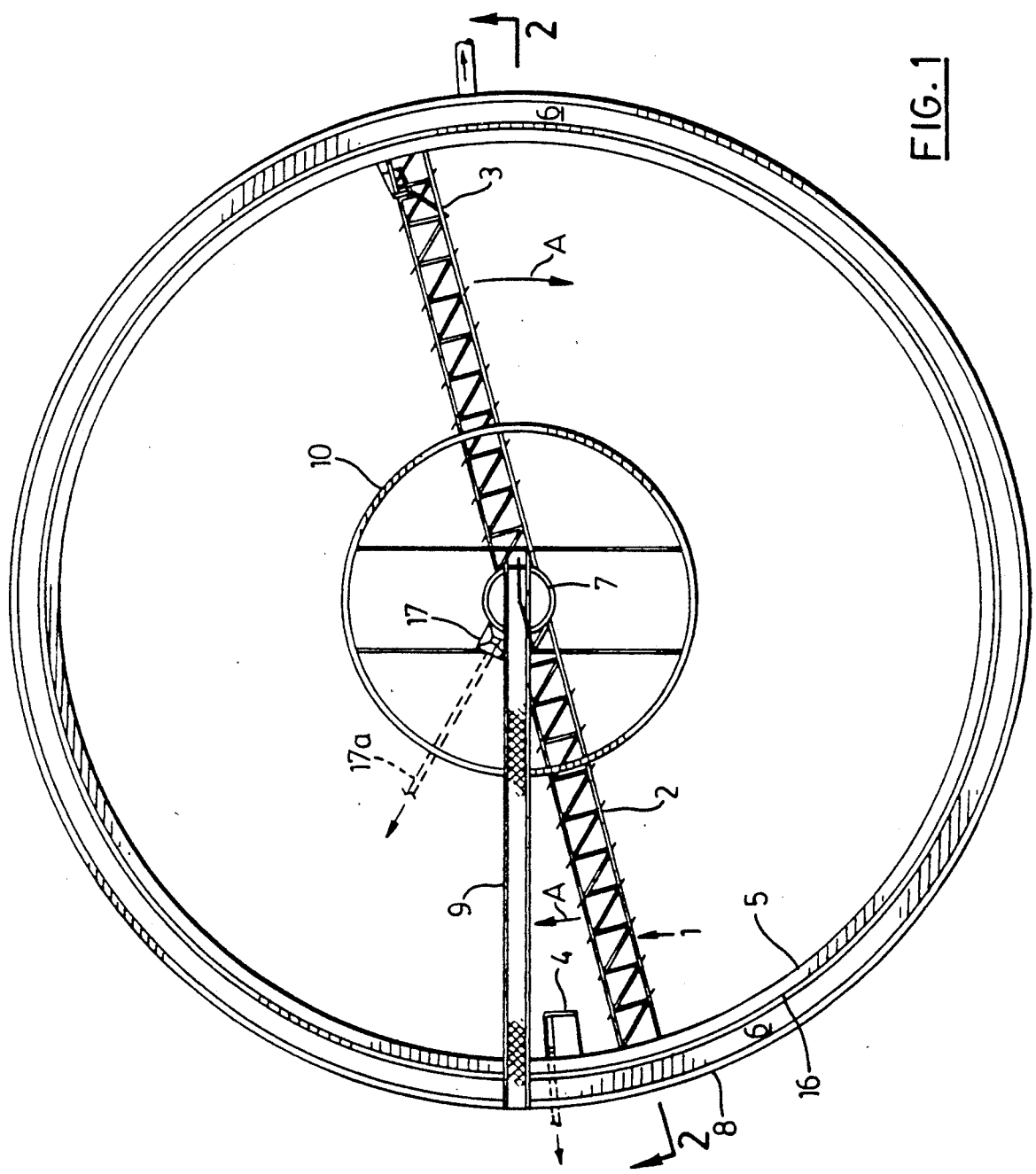
FIG. 1 is a plan view of a common circular sedimentation tank.

FIG. 1 is a plan view of a conventional circular sedimentation tank showing typical sludge collection and scum skimming equipment. In the drawing are shown sludge rake arms 1 with sludge plow blades 2 angled 45°, a scum skimmer 3 supported from the sludge rake arm 1, and a scum trough 4 next to a circular scum baffle 5 which runs the full length of the periphery along an effluent channel 6. The sludge rake arms 1 turn slowly around the centre of the tank in the direction of arrows A and they are supported from a central drive unit 7. The sludge blades 2 move the bottom sludge towards the centre of the tank and the scum skimming blade 3 moves floating scum towards the scum trough 4 at the periphery. The centre drive unit 7 is connected with an outer tank wall 8 by a steel access walkway 9. The walkway 9 also supports a centre inlet baffle 10.

Figure 2:
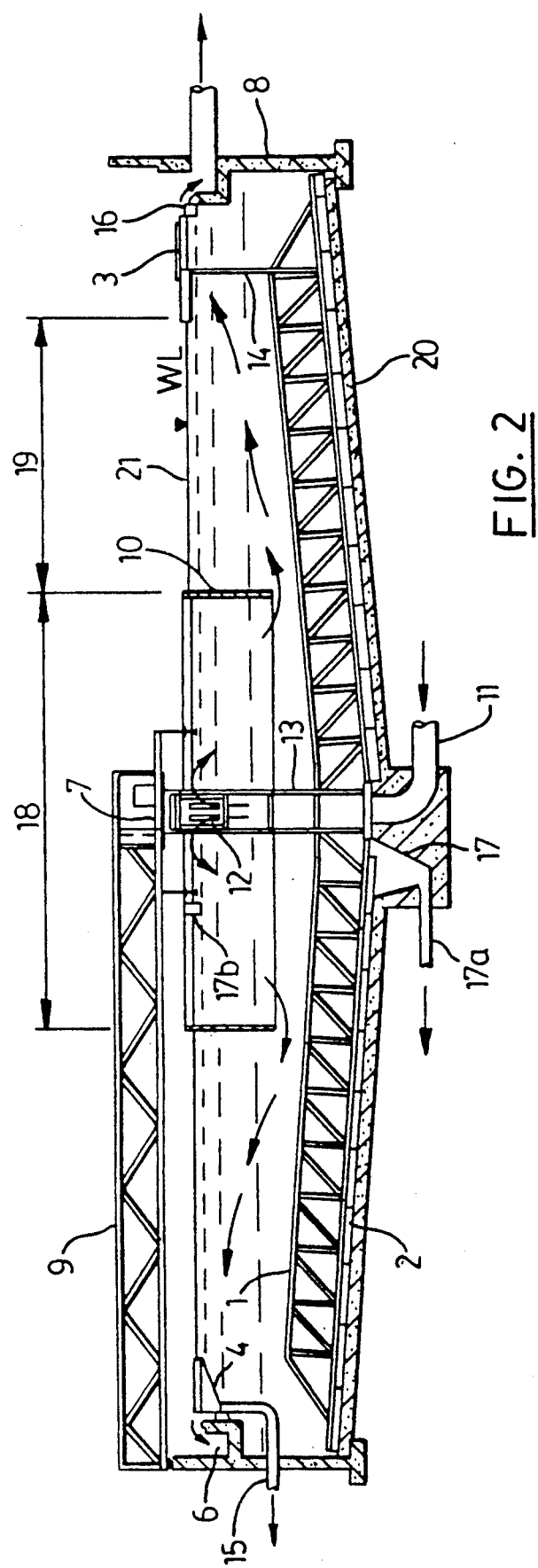
FIG. 2 is a side view of the tank of FIG. 1.

FIG. 2 is a side sectional view showing the above items as well as a sewage influent pipe 11, center inlet ports 12, a center support cage 13 for the rake arms 1, a scum skimmer support 14, and the scum trough 4 with a discharge pipe 15. The clarified sewage is shown flowing over an effluent weir 16 into the effluent channel 6.

The settled bottom sludge that is gradually being raked to the center is collected in a sludge well 17, from where it is pumped out through the sludge pipe 17a. In the inlet baffle 10 is shown a small scum outlet port 47. This sectional view shows clearly the large area 18 where scum can get trapped inside the inlet baffle 10, and also the large area 19 not being positively skimmed of floating scum.

Figure 3:
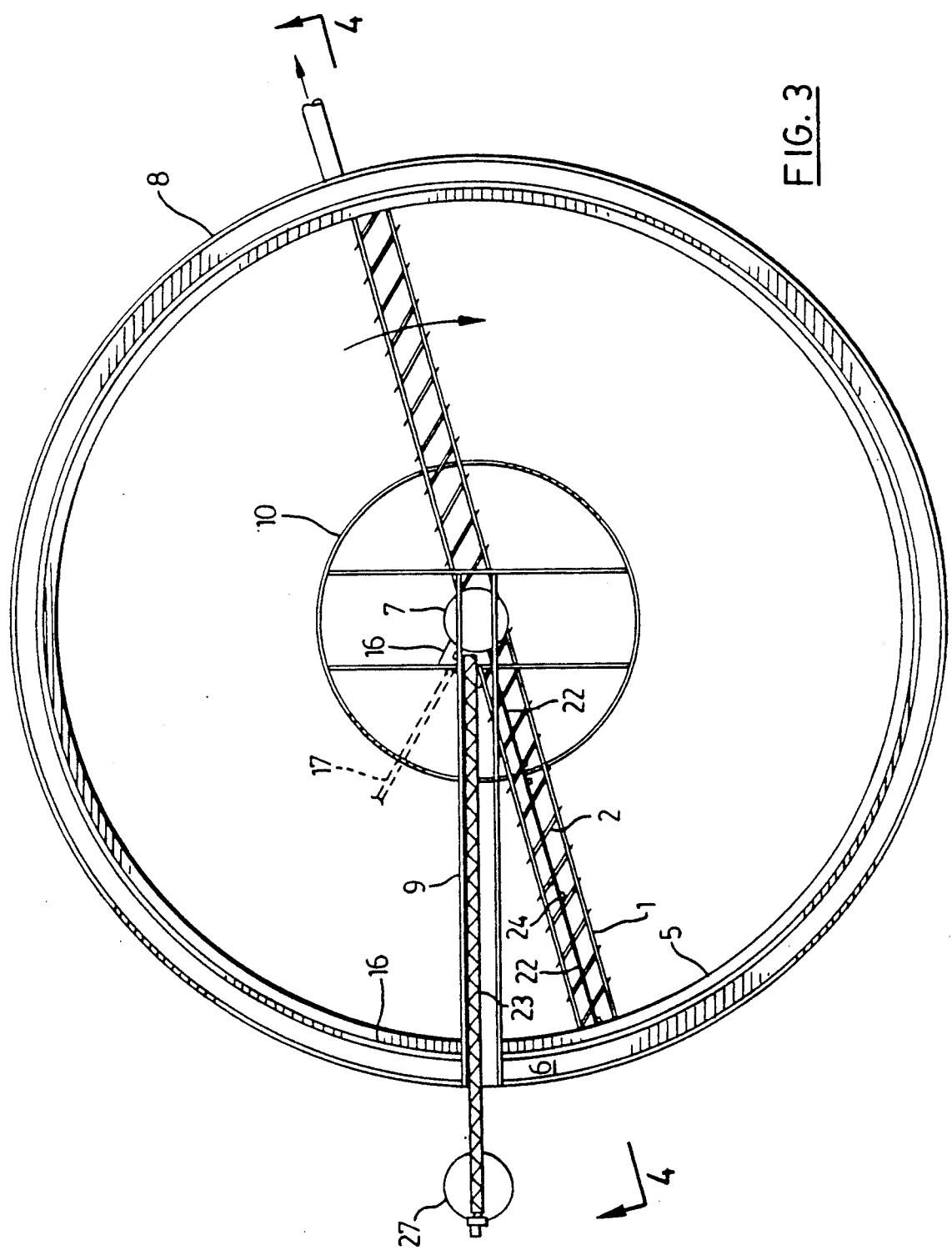
FIG. 3 is a plan view of a circular sedimentation tank according to the present invention.
Figure 4:
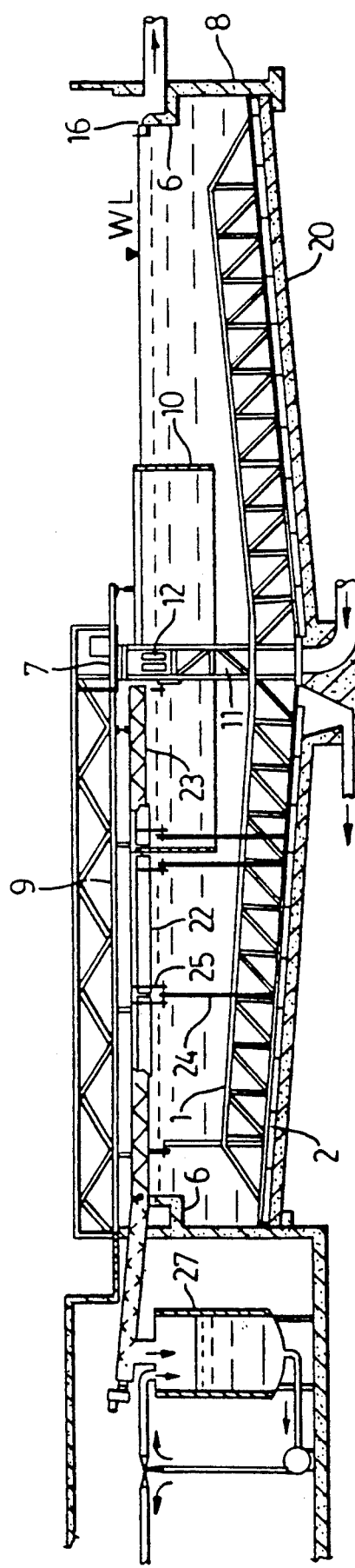
FIG. 4 is a side view of the tank of FIG. 3.

In FIGS. 3 and 4, like features to those in FIGS. 1 and 2 are shown with the same reference numeral like the circular side wall 8, a conical bottom 20, the sewage influent pipe 11 with the center inlet ports 12 and a peripheral effluent weir 16 mounted on the effluent channel 6.

The sedimentation tank is filled with sewage, including waste solids through the inlet ports 12 in the inlet tube 11 until the tank is filled to a water or liquid level 21. Although the level of liquid is herein frequently called "water level", it should be understood that the word "water" is a simplified description of the material in the tank which may be any combination of liquid and solid or semi-solid materials. The water level 21 is set by the elevation of the effluent overflow weir 16 mounted on the edge of the effluent channel 6.

The heavier materials in the incoming sewage settle as sludge to the bottom 20 of the tank and are removed in the usual manner as described for the sedimentation tank shown in FIG. 1 and FIG. 2.

However, unlike the tank of FIGS. 1 and 2, any lighter, floatable solids materials which rise and form a floating scum layer on top of the liquid in the tank in FIG. 3 and FIG. 4 will be removed by a combination of a skimmer blade 22 and a screw conveyor 23 as hereinafter described.

Figures 8, 9:
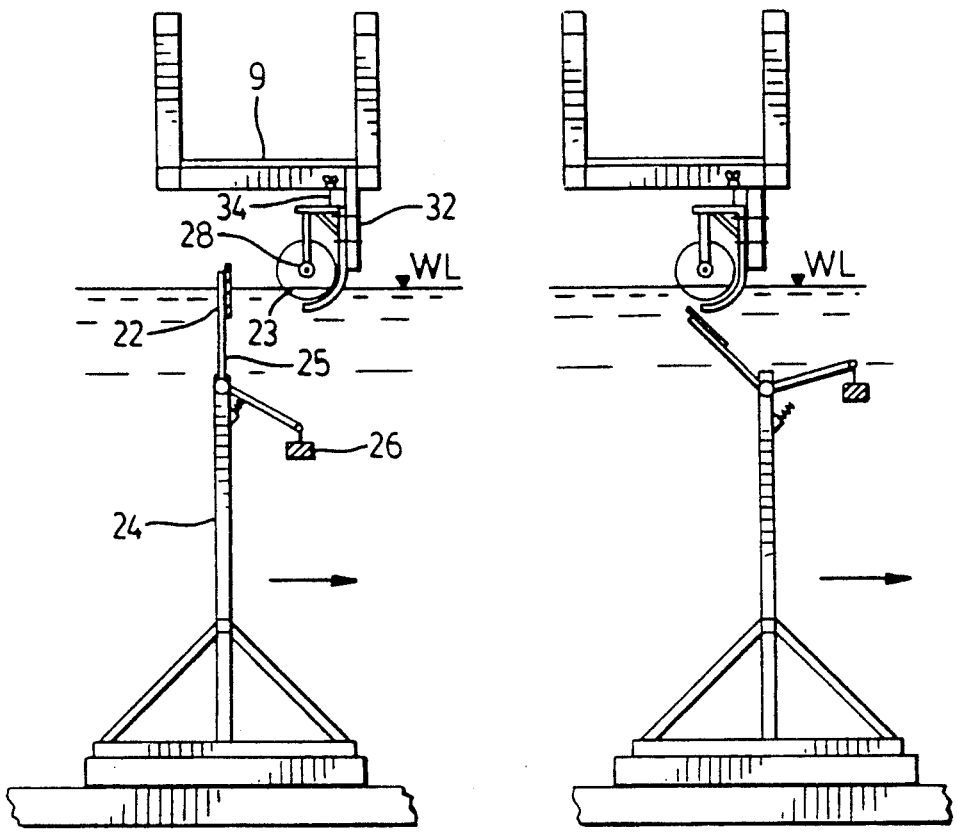
FIG. 8 is a side view of the scum baffle approaching the screw conveyor of FIG. 5.
FIG. 9 is a side view of the scum baffle passing beneath the screw conveyor of FIG. 5.
Figure 7:
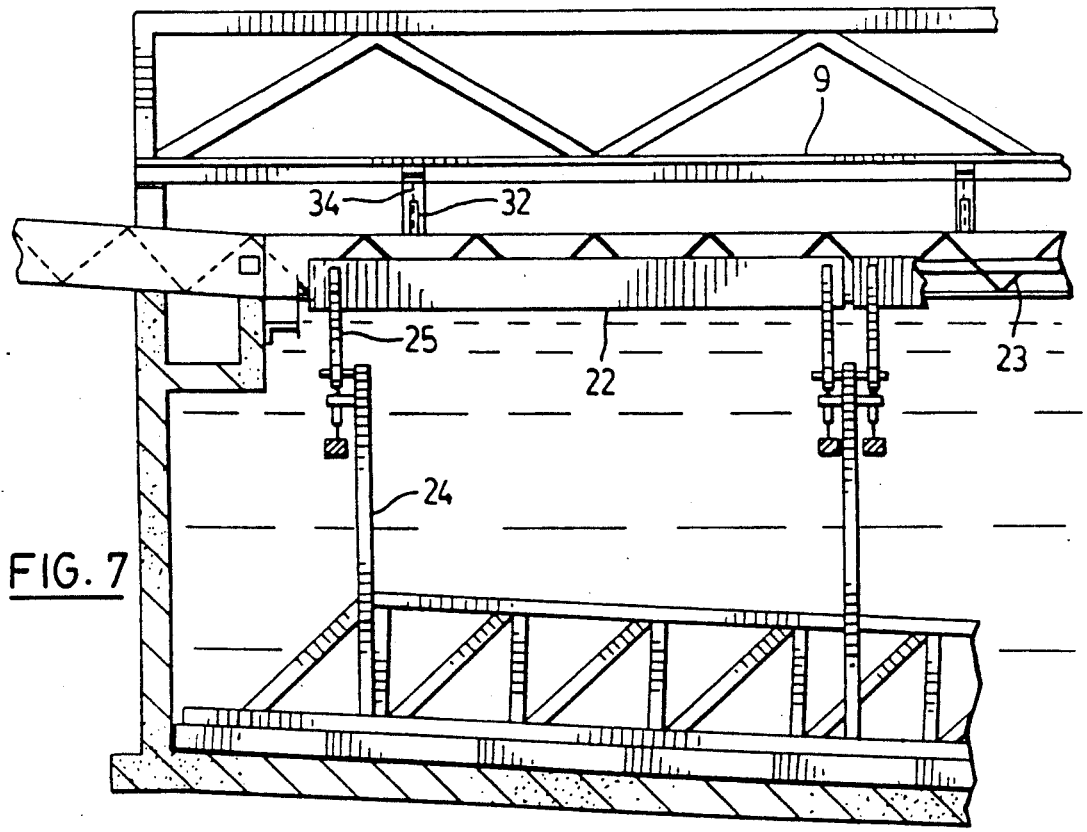
FIG. 7 is a detail view of one end of the screw conveyor of FIG. 5.
Figure 10:
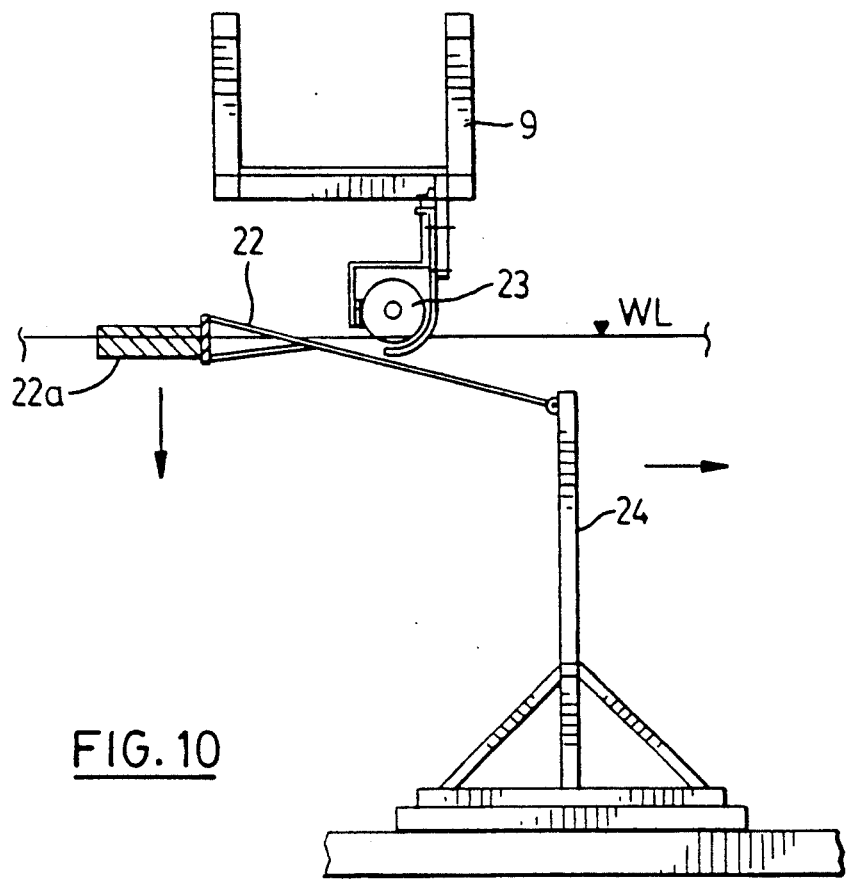
FIG. 10 is an alternate embodiment of the scum baffle.

The skimming blades 22 are supported on vertical posts 24 extending upwardly from the sludge rake arm 1. The skimming blades 22 preferably skim the entire tank surface at water level 21 during each rotation of the sludge rake arm 1 around the central drive area 7. The upper portions 25 of the vertical skimmer supports 24 are hinged or articulated to allow the skimmer blades 22 to pass below the screw conveyor 23 as shown in FIG. 8 and FIG. 9. The hinged skimmer supports 25 are weighted with counter balances 26 or springs 26A to ensure that the skimmer blade 22 will return to an upright position again once it has passed below the screw conveyor 23. The skimmer blade 22 may be divided in two or more segments depending on the size of the tank. A segment of skimmer blade 22 also preferably skims the surface inside the centre inlet baffle 10. FIG. 10 shows an alternative skimmer blade 22. In this embodiment a float 22a supports a pivotally attached skimmer blade 22.

When the surface scum has been brought up near the screw conveyor 23, a motor is started which causes the screw conveyor 23 to turn. This has the effect of pulling the scum into and along a trough 29 and out of the sedimentation tank into a scum containment vessel or scum hopper 23 as described in more detail below.

Figures 11, 12:
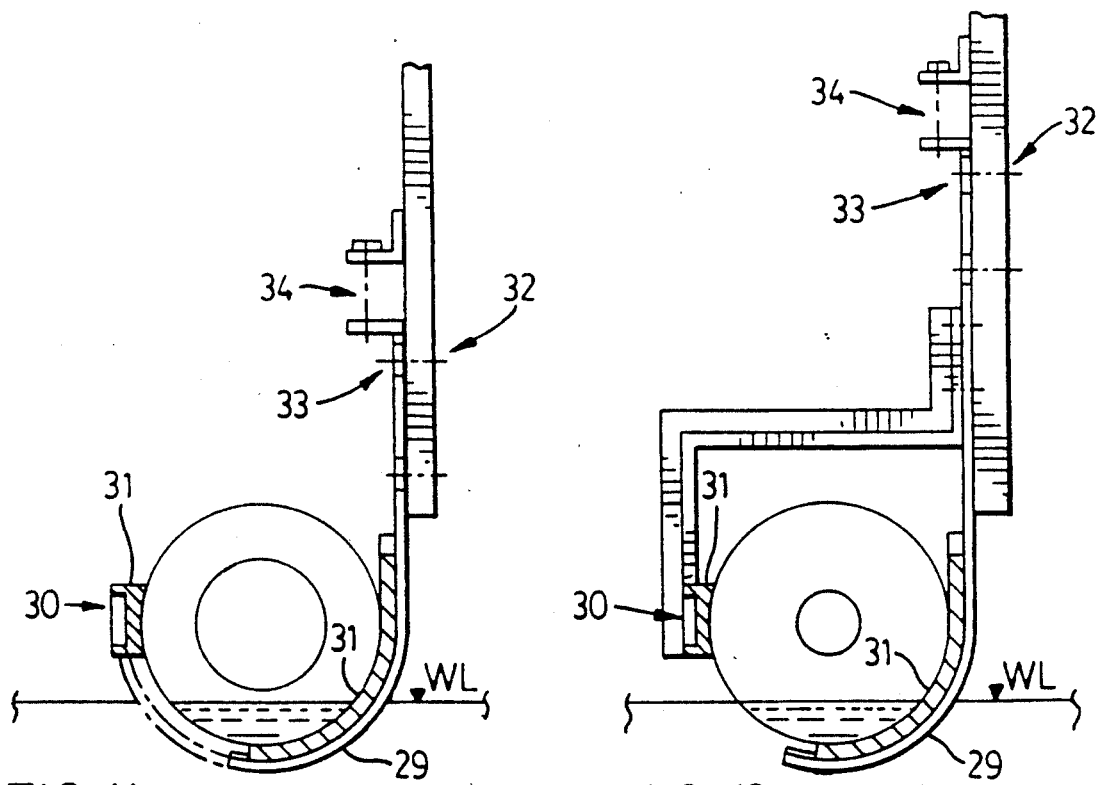
FIG. 11 is an alternate embodiment of the screw conveyor.
FIG. 12 is a further alternate embodiment of the screw conveyor.
Figure 13:
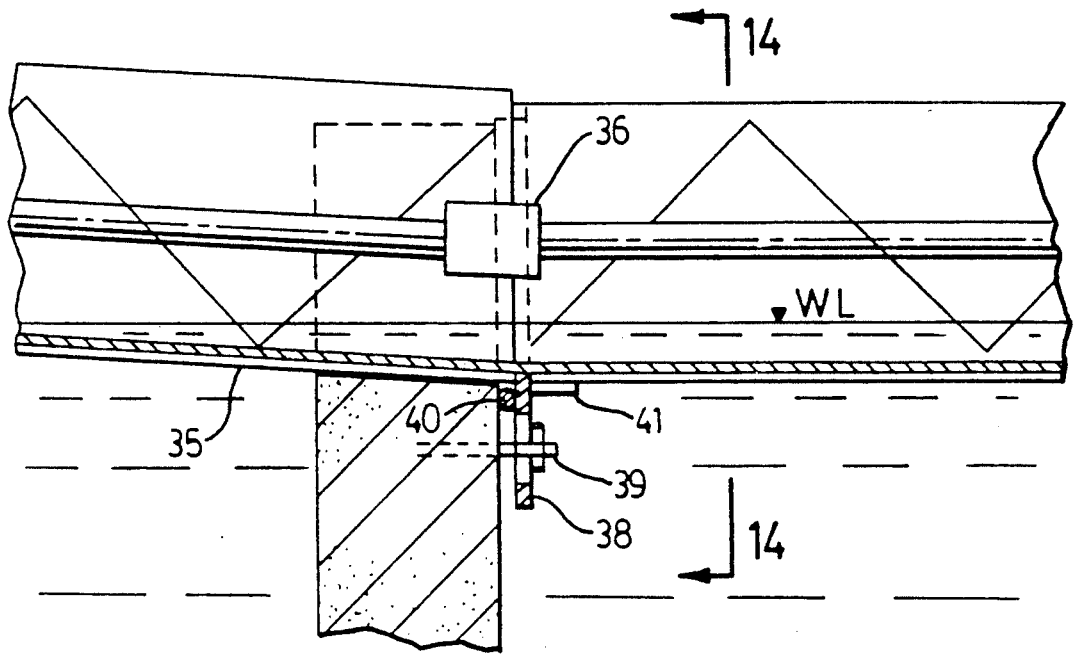
FIG. 13 is a detailed view of the screw conveyor as it passes out of the tank.

The screw conveyor 23 is suspended horizontally below the walkway 9 so that only the bottom part of the screw 23 is below the liquid level 21. In FIG. 3 the walkway grating is removed for clarity. The screw 23 extends from the centre drive 7 to the tank wall 8, passing through an opening in the central inlet baffle wall 10. The screw 23 may be suspended using intermittently located hanger bearings 28 and the trough section 29 supported independently as shown on FIG. 8. Alternatively, the screw may be supported by the partial trough 27 and kept in position by a retainer bar 30 as shown in FIG. 11 and 12. The trough section 29 and retainer bar 30 are fabricated from any suitable material such as steel or the like with a lining 31 of low friction plastic material such as teflon or the like.

The arrangements shown in FIG. 11 and 12 are the most preferred as the screw may be either the shaftless ribbon type as indicated in FIG. 11 or the shafted type as indicated in FIG. 12.

Further, with the intermittent hanger bearings 28 as indicated in FIG. 8 the blade of the screw 23 is split into sections with gaps at each bearing point. Such gaps increase the chances of stringy material getting caught around the shaft and around the bearing supports which could eventually jam. Thus, the plastic liner support alternative permits the use of continuous screws which minimizes the chances that rags and stringy material in the scum will get caught on the screw and is more preferred for that reason.

Figure 14:
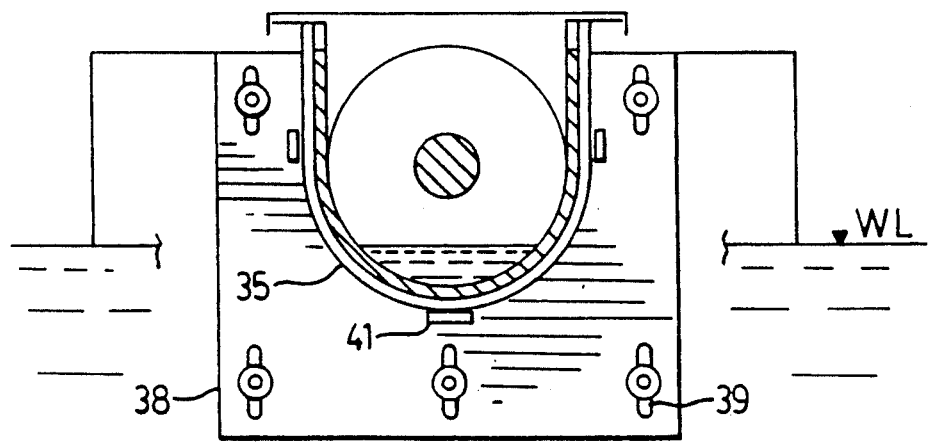
FIG. 14 is an end view of the detail of FIG. 13.

Each of the alternatives shown in FIG. 8, 11 and 12 are provided with fastening bolts 32 with vertically slotted bolt holes 33 and adjustable suspension bolts 34 to allow easy adjustment of the trough 29 and screw 23. This permits optimizing of the liquid solids separation to suit the type of scum being handled by the treatment facility. It will be appreciated that the type of scum may vary over time, or with the change of seasons or the like.

Where the screw 23 and the trough 29 reaches the wall of the effluent channel 6, the trough section is changed to a fully enclosed trough as shown in FIG. 14. The enclosed trough is angled slightly upward and the screw 23 is either hinged using a universal joint 36 allowing it to follow the slope of the trough or is of tapering diameter to accommodate such an incline.

It will be appreciated that the slope of the trough and screw has the beneficial effect of allowing liquid to drain back and thereby separate from the scum, to be returned into the main tank while the separated scum is transported up and discharged into a scum hopper or containment vessel 27 from which it may be later pumped away. The sloping surface also prevents loss of liquid from the tank when the screw is not operating.

The end of the full trough section 35 is sealed against a concrete wall 37 of the channel 6 using a steel plate 38 with fastening bolts and adjustment slots 39. A soft rubber gasket 40 is used to provide tight seal against the concrete. Guide posts 41 are fastened on the plate 38 to guide the trough 29 and to ensure proper alignment of the two troughs and the two screw segments.

Figure 15:
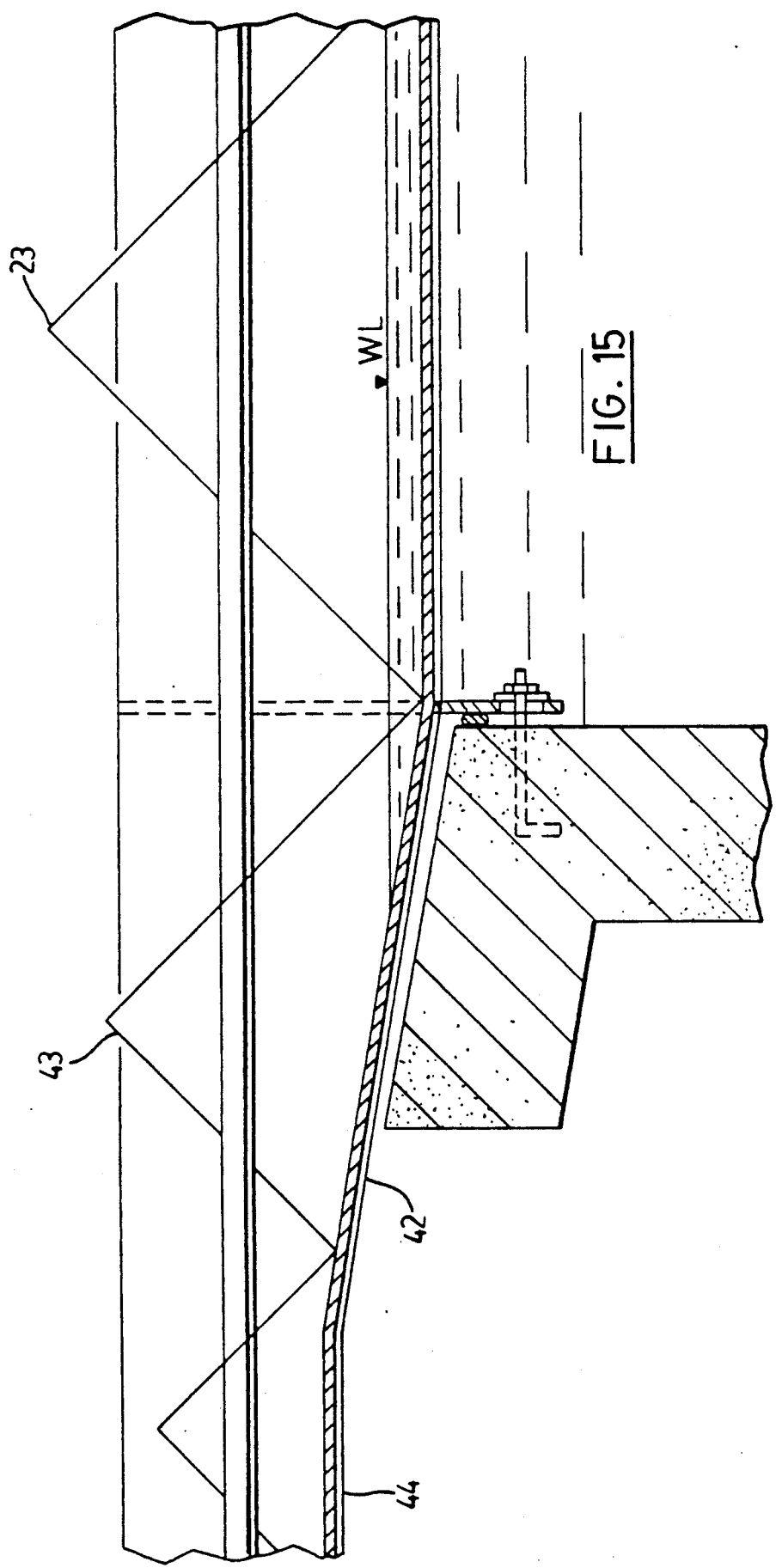
FIG. 15 is an alternate embodiment to FIG. 13.

As an alternative to the two screw segments joined by a universal joint, it is also possible to use a larger diameter screw 23 across the tank surface which then tapers to a smaller diameter outside the tank wall. A conical trough section 42 matching the screw taper 43 helps to separate the excess waste liquid from the scum solids and prevents the liquid from escaping from the sedimentation tank. This alternative is shown in FIG. 15. As there is a small clearance between the screw and the trough, water will drain back under gravitation force to the sedimentation tank, while scum moves up into the smaller diameter trough 44. For this alternative a shafted screw is preferable.

In either of the above alternatives the screw is driven by an electric motor 45 in a known manner through an enclosed gear reducer to get a slow turning speed of 20 to 30 revolutions per minute.

It can now be appreciated how the present invention operates. A scum layer forming at the upper liquid level of the circular sedimentation tank (or floating sludge in the case of a dissolved air floatation thickening tank) will be continuously swept around the tank by a scum skimming blade 22 located at the liquid surface and extending from the center drive 7 to the scum baffle 5 at the tank periphery. The blade 22 is divided in two or more sections one of which is preferably inside the circular baffle.

Each rotation the scum blade 22 drives the floating material towards, and then onto the rotating screw 23 which is suspended in a fixed location and stretches from the tank center to the tank wall. The supports 24 and 25 for the blade 22 are hinged and counter balanced or spring supported such that when the blade encounters the screw 23, or trough 29, it will tilt backwards, dip below the screw 23 and then re-appear on the other side, where it will again start bringing scum around the tank. The guide bar 30 will in addition to supporting the screw 23, prevent the blade 22 from being damaged by the rotating screw 23, The screw 23 is preferably positioned below the access walkway 9 to use common support beams and to simplify inspection and maintenance. The screw 23 extends from the tank centre to the tank periphery and then further to a containment vessel or scum hopper 27 located outside the circular tank and outside the effluent trough 6. The screw and trough preferably pass through a small opening in the inlet baffle 10 and through another opening in the perimeter wall 8.

Figure 5:
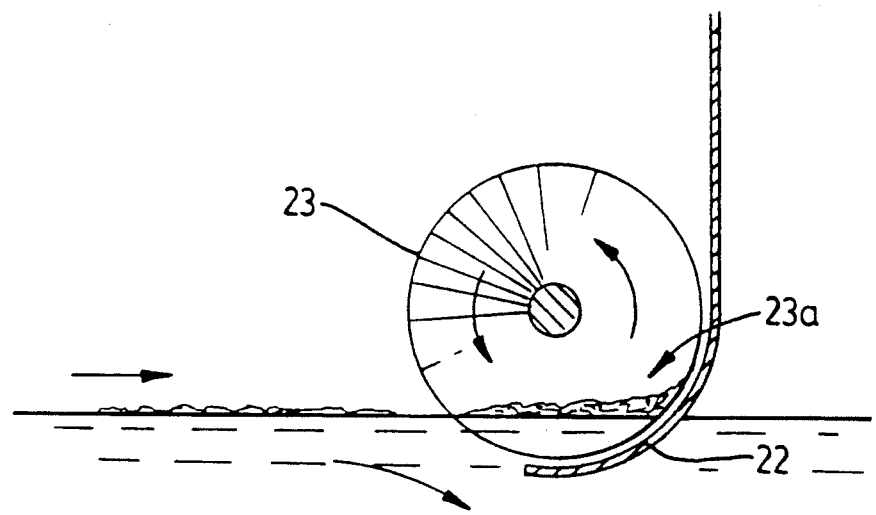
FIG. 5 is an end view of a screw conveyor according to the present invention.
Figure 6:
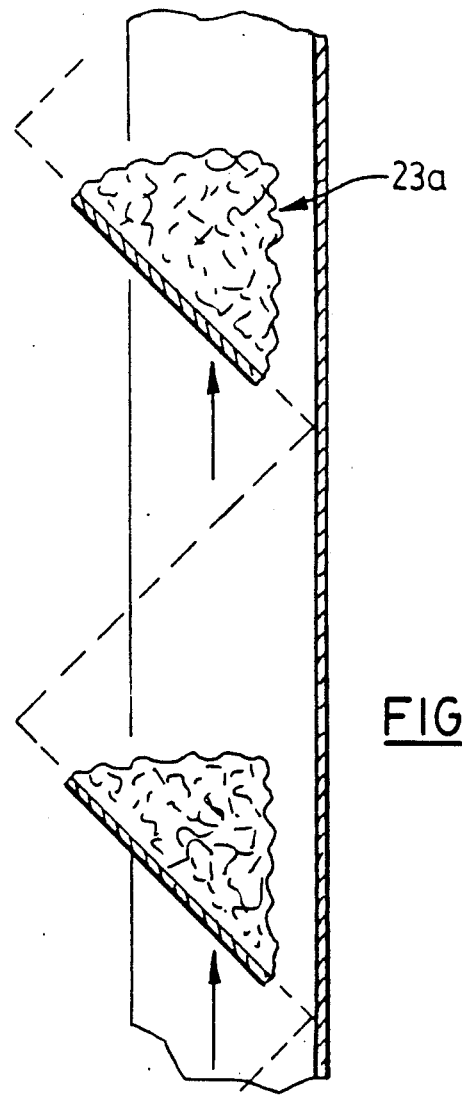
FIG. 6 is a top view of the screw conveyor of FIG. 5.

The helical screw 23 is arranged to simultaneously transport floating material to the outer periphery, separate floating material (such as scum or sludge) from liquids and for delivering the separated material to a containment vessel using one single device. The action of the screw 23 on such floating material is shown schematically in FIG. 5 and FIG. 6.

The screw 23 is positioned such that it is only partly submerged in liquid while being contained in a U-trough 29 having a opening along the one side. The opening face the approaching skimming blade 22 and is located near the liquid level so that floating material can enter the opening and encounter the helical screw 23. Of course, this encounter is prompted by the scum skimming blade 22 pushing the floating material into the opening. The screw 23 is driven by a motor and gear drive unit so that when the screw is rotating the scum and liquid are pulled inwardly past the opening to the opposite side of the trough. In this manner, the floating scum is pulled in through the open slot and is trapped between the angled bottom section of the screw blade and the bottom and lower side of the trough.

The trapped scum 23a (see FIG. 6) is therefore transported along by the screw through the trough. The continuous removal of scum by the screw blades has the effect of continuously pulling additional scum into the screw. This action works in conjunction with the tilting skimmer blades 22 to effectively remove the floating material from the liquid.

As will be appreciated by those skilled in the art, since the removed scum is usually heated and digested or dewatered and incinerated a scum having a lower water content is normally desirable. To reduce the water content in the scum and to prevent water loss from the sedimentation tank an upwardly sloping segment of full section U-trough is provided at or near the screw discharge end located at the periphery of the sedimentation tank. This U-trough rises above the liquid level and continues to the scum hopper 27. The upwardly sloping section can be achieved by the use of an equal sized sloped screw and a universal joint in the conveyor shaft or alternatively by using a screw that is tapered at the end together with a U-trough with a narrowing conical section to fit the gradually reducing diameter of the screw.

Although it is generally desirable to obtain substantially de-watered scum for further treatment of the scum, there may be cases when the scum has to be pumped a long distance. Dry scum can be difficult to pump, so it may be necessary to add water to get the desired consistency. Addition of water for dilution can be done from a direct connection to the plant water system. As an alternative the dryness can be varied by raising or lowering the screw to vary the amount at submergence of the screw and the trough and/or by varying the steepness of the inclined portion and thereby the amount of liquid in the delivered scum.

Adjustment of the screw submergence is facilitated by suspending the screw and trough unit on threaded rods with hand wheel adjustment. The horizontal screw and the sloping screw are moved up or down as one unit. This flexibility is especially desirable for plants handling seasonally variable wastes, such as from fruit and vegetable canneries and from other food processing industries.

The level of scum contained in the containment vessel 27 is controlled either manually or automatically. If automatically controlled it is preferable to use a level sensor to start the pump when a preset level in the vessel is reached. To improve the pumpability of the scum and to reduce the chances of line plugging, the scum and a diluting liquid can be mixed using a 3-way valve which has the effect of recycling material back into the hopper or vessel for a short period before the valve is changed and the pump-out cycle started.

One other method of improving the pumpability is by heating of the scum and liquid mixture. This may be done using a vessel with a hot water jacket. Heating combined together with mixing by recycling is the most efficient way of producing an easily flowing material without addition of excess water.

It can now be appreciated that with the removal of the floating scum as described above and the removal of sludge as in conventional tanks, the liquid being treated is clarified. Thus, the majority of the liquid, having been so clarified eventually overflows over the effluent weirs and is taken to the next treatment stage.

As previously discussed tee screw 23 is preferably one of two types, namely one with a central shaft and a full blade, or the one that is of the shaftless ribbon type. The shaftless screw consists of a stiff self-supporting steel ribbon that does not require the shaft for transmittal of the turning torque. The shafted screw may be fabricated entirely from steel, stainless or mild steel with protective coating, or it may be fabricated from a plastic material, such as nylon or polyethylene with an encased steel shaft core for torque transmission.

The shafted screw may be supported either by regular hanger bearings, or the entire screw may be allowed to "float" on a trough liner of suitable high density low friction plastic material, such as ultra high molecular weight polyethylene. A strip of plastic material is also preferably used as a side guide on the partially open side of the trough. The shaftless screw is only suitable for supporting on the plastic liner material.

When the shafted conveyor is used, the sloping portion can be created by a tapering screw in a conical trough segment with 180° full bottom section. Alternatively the sloping portion can be a full 180° trough of constant diameter supporting a full size screw connected to the main screw with an universal joint connection that allows a change in angle while the two screw segments are driven in unison by the single drive unit. The universal joint allows for transmission of torque as well as the tension required for pulling the scum along the tank surface. To protect the joint against moisture, it is preferably enclosed in a flexible rubber sleeve, which is filled with grease and clamped to the shaft on both sides of the joint. When shaftless screw segments are used the constant diameter trough and screw are used and the universal joint is connected to two short stub shafts connected to the helical screws.

As an alternative to extending the screw 23 across the inlet baffle 10, a scum cleaning blade system can be used inside the inlet baffle 10, which transports scum through openings to the outside of the baffle 10 where it can then be collected as described above. The circular sedimentation tank has a central inlet tube 11 with inlet ports 12 near the tank surface. Through said ports 12 waste water flows into the tank to a generally fixed liquid level, which is set by the elevation of the outlet weir 16 along the tank periphery. To improve the flow pattern of waste liquid in the tank and to eliminate short circuiting of waste water along the liquid surface the cylindrical inlet baffle 10 is suspended around the inlet tube. However, the inlet baffle extends from just above the liquid level 21 to approximately half the liquid depth. The inlet baffle will normally trap floating scum which creates odor problems.

The scum cleaning blade system which is designed to prevent scum build-up consists of a curved surface skimming blade 46 that moves along the inside of the baffle 10 and concentrates the floating scum near the inside of the baffle 10. In tanks with fixed inlet baffle 10 supported from the access walkway 9 and the centre drive 7, the curved blade 46 is supported from the rotating sludge collector rake arm 1 at the tank bottom. In tanks with rotating inlet baffle supported from the rake arm drive cage 13, the curved skimmer blade 46 is suspended from the walkway beams or trusses 9.

Figure 16:
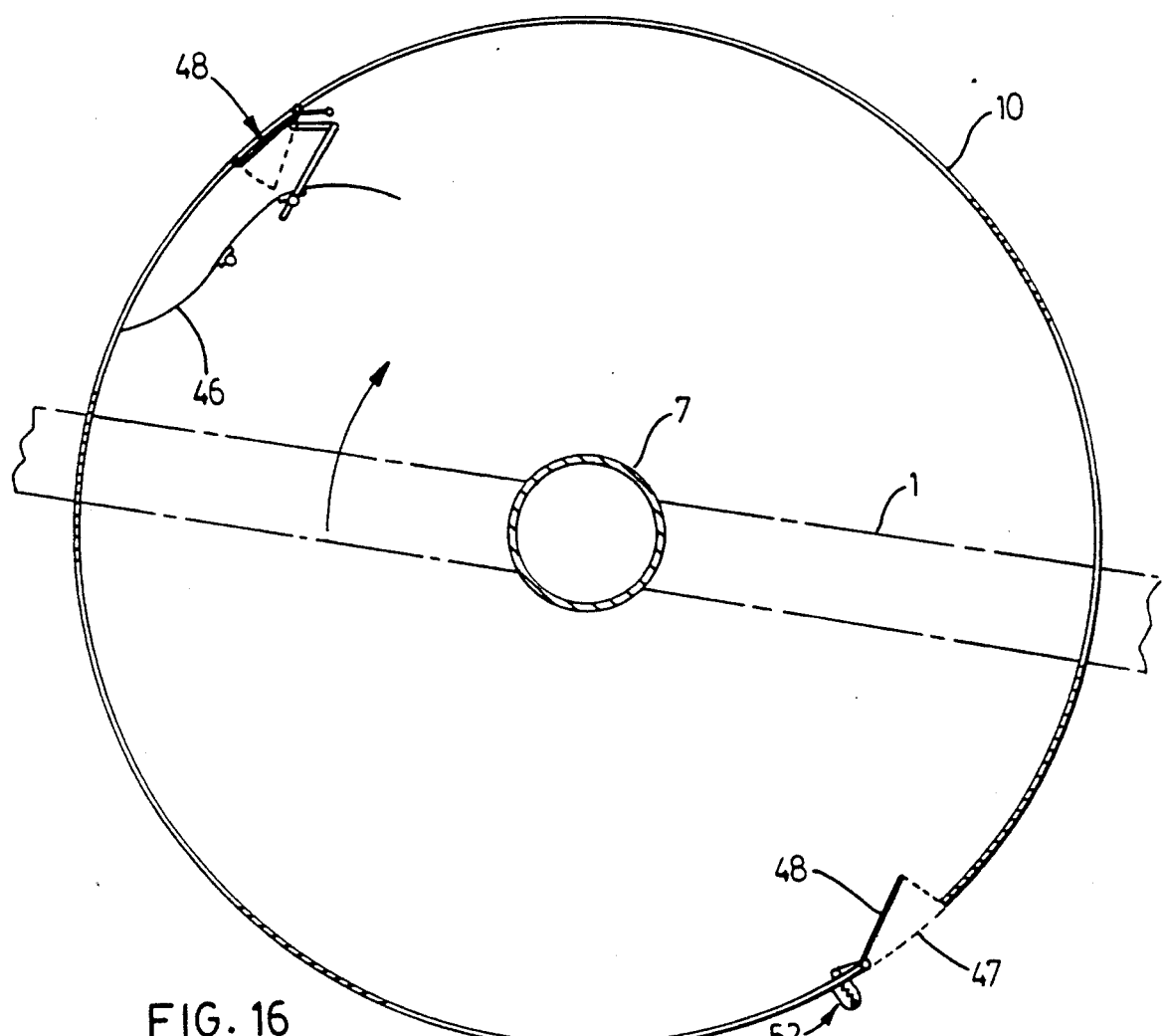
FIG. 16 is a top view of a central scum skimming blade.
Figure 17:
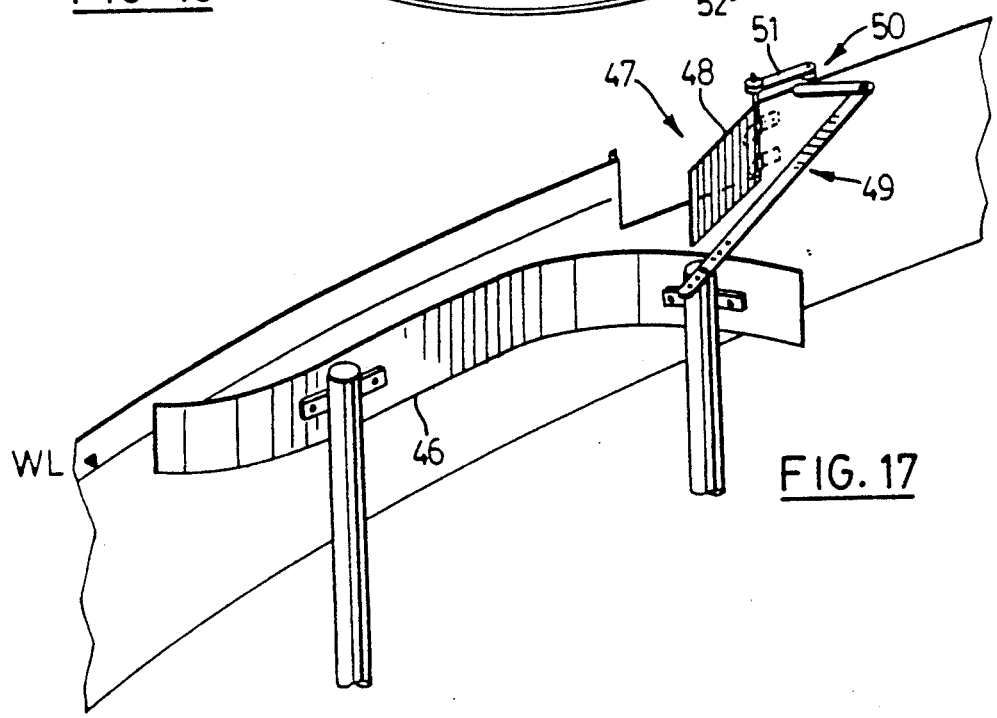
FIG. 17 is a detailed view of the blade of FIG. 16.

In both cases the curved blade 46 moves in relation to the inlet baffle 10 and continuously collects scum along the inside of the baffle 10. The baffle 10 has two or more ports 47 with hinged lids 48 near the liquid level. The lids 48 are opened on an angle and extend inside the baffle 10 to catch the scum collected by the curved blade 46. The lids 48 direct the scum out through the ports 47. The lids 48 may be normally closed as indicated in FIG. 16 and FIG. 17 and may be opened by an arm 49 striking a roller 50 connected to the lid 48 by a short lever arm 51 as the curved blade 46 is approaching the port 47.

The lid 48 is again closed by the curved blade 46 as it passes the port 47 and the scum is pushed out. If desired, the hinged lid 48 may be normally open as shown on FIG. 16. The angled lid is held open by a spring 52 except when forced closed by the passing curved blade 46. Once the blade 46 has passed and the scum is forced out, the spring 52 will again open the lid 48 to the set angle.

In both alternatives the result is a positive transfer of a set volume of scum through each port each revolution. The normally open alternative may be changed if desired to normally closed simply by removal of the spring 52.

It will be appreciated by those skilled in the art that the foregoing description relates to preferred embodiments of the invention, and that many variations are possible within the broad scope of the claims. Some such variations have been discussed above, and others will be apparent. For example, while it is preferable to extend the screw into the central inlet baffle area, it is not essential, as other scum removal means can be employed such as the curved scum cleaning blade system.

It is also possible to employ the scum cleaning blade system together with commonly used collection systems in particular when up-grading existing sedimentation tanks.

The embodiments of the invention in which on exclusive property or privilege is claimed are defined as follows:

1. A scum skimming device for use in a waste treatment system having a sedimentation tank, said tank being an enclosure defined by a bottom and a surrounding cylindrical wall, said tank having a central waste liquid inlet pipe having inlet ports, and having an outer outlet weir to maintain the waste liquid level in said tank substantially constant, the scum skimming device comprising:

a scum skimming blade which is biased into a position partly above and partly below the liquid surface and which sweeps the surface of the tank, said blade being supported from a bottom sludge rake by articulated support posts;

a generally helical blade extending radially to the tank periphery, and being positioned with a portion of the helical blade below the waste liquid level when the tank is in use;

a drive means for rotating said generally helical blade and a trough partially enclosing said helical blade, said trough being open along one side at about the liquid level to allow floating scum to enter the trough and encounter the helical blade said scum skimming blade directing said scum through said trough opening and into contact with said helical blade, said helical blade being rotated by said drive unit, said rotation tending to keep said scum in said trough while moving said scum lengthwise along said trough and elevating said scum above said liquid surface and permitting said waste liquid to drain back into said tank to separate said scum from said liquid and move said scum to a discharge point outside said tank.

2. A scum skimming device as claimed in claim 1 where said helical blade has a central shaft and is intermittently supported by hanger bearings.

3. A scum skimming device as claimed in either one of claim 1 and 2 wherein said trough is lined by one or more low friction pads.

4. A scum skimming device as claimed in claim 1 wherein said helical blade is either shaftless or has central shaft and is supported in place on at least one low friction pad.

5. A scum skimming device as claimed in either one of claim 2 and 4 wherein a portion of said trough near a wall of the tank has a full bottom section for containment of scum, and is upwardly sloped in the direction of travel of said scum through said trough whereby liquid drains from said scum as said scum is moved upward along said sloping trough portion by said helical blade.

6. A scum skimming device as claimed in claim 5 wherein said sloped trough portion contains a sloped blade having a constant diameter equal to the horizontal blade and wherein said sloped blade is connected to horizontal blade by a flexible universal joint whereby both blades turn, in unison.

7. A scum skimming device as claimed in claim 5 wherein said sloped trough segment is conical and narrows upwardly and said helical blade is conical with a diameter corresponding with said conical trough portion and wherein the helical blade has a common rigid shaft for a horizontal portion and said conical portion.

8. A scum skimming device as claimed in either one of claim 6 and 7 including an outlet end of said sloping trough portion which discharges into a containment vessel for intermittent storage and for conditioning of the discharge whereby said mixture may be pumped to further treatment or disposal.

9. A scum skimming device as claimed in claim 8 wherein said containment vessel is heated to produce a discharge with lower viscosity to allow mixing and pumping of said discharge to said further treatment or disposal.

10. A scum skimming device as claimed in claim 9 including a pump for emptying said containment vessel, said pump having a discharge line with a 3-way valve allowing either direct emptying of discharge or alternatively return of bottom content to the top of the containment vessel for vigorous mixing.

11. A scum skimming device as claimed in claim 10 where in the event said discharge is excessively dry, said discharge may be diluted by means of direct water injection for easy pumping.

12. A scum skimming device as claimed in claim 10 wherein said helical blade may be operated to transport additional liquid to said containment vessel.

13. A scum skimming device as claimed in claim 12 wherein said inclined portion of said trough is varied to vary the degree of liquid transported through said trough.

14. The scum skimming device of claim 1 wherein said blades are biased into said position partly above and partly below the liquid surface by a spring.

15. The scum skimming device of claim 1 wherein said blades are biased into said position partly above and partly below the liquid surface by a counterweight.

16. The scum skimming device of claim 1 wherein said blades are biased into said position partly above and partly below the liquid surface by a float.

17. A scum skimming device for use in a waste treatment system as claimed in claim 1, wherein said circular sedimentation tank includes a cylindrical baffle surrounding the central waste liquid inlet pipe, and wherein said scum skimming device further includes means within said cylindrical baffle to remove scum therefrom.

18. A scum skimming device as claimed in claim 17 wherein said means to remove scum from said cylindrical baffle comprises extensions of said scum skimming blade, said helical blade and said trough into said cylindrical baffle.

19. A scum skimming device as claimed in claim 18 wherein said means to remove scum from said cylindrical baffle comprises a curved shaped plow blade which is rigidly mounted from a walkway support structure, and said cylindrical baffle is mounted on said bottom sludge rake and moves past said plow blade, said cylindrical baffle having ports through which said scum, pushed by said plow blade, may pass.

20. A scum skimming device as claimed in claim 17 wherein said means to remove scum from said cylindrical baffle comprises a curved shaped plow blade rigidly mounted on the bottom sludge rake and scum ports located in said cylindrical baffle, said plow blade passing scum through said ports.

21. A scum skimming device as claimed in claims 20 and 19 wherein said ports include gates, and said gates include actuators, said actuators keeping said gates closed until adjacent said plow blade, whereupon said actuators cause said gates to open to allow scum to pass through said ports.

* * * * *